United States Patent
Singh et al.

(10) Patent No.: US 12,516,397 B2
(45) Date of Patent: *Jan. 6, 2026

(54) METHOD AND SYSTEM FOR OPTIMIZATION OF AGGLOMERATION OF ORES

(71) Applicant: Tata Consultancy Services Limited, Mumbai (IN)

(72) Inventors: Kuldeep Singh, Pune (IN); Sri Harsha Nistala, Pune (IN); Venkataramana Runkana, Pune (IN); Phanibhargava Vakkantham, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 969 days.

This patent is subject to a terminal disclaimer.

(21) Appl. No.: 17/632,215

(22) PCT Filed: Jul. 4, 2020

(86) PCT No.: PCT/IN2020/050585
§ 371 (c)(1),
(2) Date: Feb. 1, 2022

(87) PCT Pub. No.: WO2021/001859
PCT Pub. Date: Jan. 7, 2021

(65) Prior Publication Data
US 2022/0275475 A1 Sep. 1, 2022

(30) Foreign Application Priority Data

Jul. 4, 2019 (IN) .............................. 201921026929

(51) Int. Cl.
*C22B 1/14* (2006.01)
*C22B 1/16* (2006.01)
(Continued)

(52) U.S. Cl.
CPC .............. *C22B 1/205* (2013.01); *C22B 1/243* (2013.01); *C22B 1/244* (2013.01); *G05B 17/02* (2013.01)

(58) Field of Classification Search
CPC ......... C22B 1/205; C22B 1/243; C22B 1/244; C22B 1/20; C22B 1/245; G05B 17/02
See application file for complete search history.

(56) References Cited

U.S. PATENT DOCUMENTS

| | | |
|---|---|---|
| 8,002,871 B2 | 8/2011 | Lu et al. |
| 10,191,456 B2 | 1/2019 | Tuncer et al. |

(Continued)

FOREIGN PATENT DOCUMENTS

CN    102086484 B    5/2016

OTHER PUBLICATIONS

Dinis, Corina Maria et al., "Modeling and Simulation of Processes from an Iron Ore Sintering Plant", Matlab—Modelling, Programming and Simulations, Date: 2016, Publisher: Research Gate, https://www.researchgate.net/publication/26235644 Modeling and simulation of processes from an iron ore sintering plant/link/578732d108aec5c2e4e2fe35/download.

(Continued)

*Primary Examiner* — Brian J. Sines
(74) *Attorney, Agent, or Firm* — FINNEGAN, HENDERSON, FARABOW, GARRETT & DUNNER LLP

(57) ABSTRACT

Agglomeration process in agglomeration plants is quite sensitive to changes in input feed material characteristics. End-to-end optimization of the agglomerate process by combining all the units is difficult due to unique complexities and challenges associated with combining the individual process outputs. A method and system for optimizing the operation of an agglomeration plant has been provided. The (Continued)

system performs real time optimization on integrated wet agglomeration and thermal agglomeration process which subsequently increases the plant productivity and agglomerate quality and minimizes the operating cost and emissions from the plant. The optimization process involves various steps such as receiving data, pre-processing of data, prediction using physics-based and data-driven models of agglomeration plant, and optimization execution and configuration. The process also involves continuous monitoring of model performance and self-learning of the models in case of a performance drift. The system is also configured to estimate the key performance parameters of agglomeration plant.

19 Claims, 9 Drawing Sheets

(51) Int. Cl.
  *C22B 1/20* (2006.01)
  *C22B 1/243* (2006.01)
  *C22B 1/244* (2006.01)
  *G05B 17/02* (2006.01)

(56) References Cited

U.S. PATENT DOCUMENTS

| | | |
|---|---|---|
| 2008/0183311 A1* | 7/2008 | MacArthur ............ G05B 17/02 700/29 |
| 2009/0048815 A1 | 2/2009 | Hamm et al. |
| 2009/0193936 A1 | 8/2009 | Lu et al. |
| 2011/0137441 A1 | 6/2011 | Kim |
| 2018/0314216 A1 | 11/2018 | Tuncer et al. |

OTHER PUBLICATIONS

Tiebin, Wu et al., "Quality prediction modeling for sintered ores based on mechanism models of sintering and extreme learning machine based error compensation", Material Science and Technology, Date: 2018, vol. 38, Publisher: e3s-conferences, https://www.e3s-conferences.org/articles/e3sconf/pdf/2018/13/e3sconficemee2018 02002.pdf.

International Search Report and Written Opinion mailed Jan. 13, 2021, in International Application No. PCT/IN2020/050585; 11 pages.

* cited by examiner

METHOD AND SYSTEM FOR OPTIMIZATION OF AGGLOMERATION OF ORES

PRIORITY CLAIM

The present application is a U.S. National Stage Filing under 35 U.S.C. § 371 and claims priority from International Application No. PCT/IN2020/050585, filed on Jul. 4, 2020, which application claims priority from Indian Patent Application number 201921026929, filed on Jul. 4, 2019. The entire contents of the aforementioned applications are incorporated herein by reference.

TECHNICAL FIELD

The disclosure herein generally relates to the field of ore agglomeration, and, more particularly, to a method and system for optimization of agglomeration processes such as sintering and pelletization that are used for agglomerating ores of metals such as iron ore, zinc ore, manganese ore, etc. in an agglomeration plant.

BACKGROUND

During mining operations, mechanized mining of ores generates a large percentage of fine particles that cannot be directly utilized for extraction of metallic content. The fine particles need to be increased in size using appropriate agglomeration processes to yield agglomerates that can then be utilized in furnaces such as blast furnaces, submerged arc furnaces, rotary kilns, etc. for extraction of metallic content from the ores. Sintering and pelletization are two widely used agglomeration processes that involve blending/mixing of ore fines along with fluxes, fuel and other additives to yield input feed mix, wet agglomeration of the input feed mix via granulating or balling to yield wet agglomerate (green mix or green balls), charging and subjecting the wet agglomerate to thermal agglomeration to yield fired agglomerates such as sinter or pellets, and cooling and sizing of the agglomerates. Blending/mixing may be carried out using stackers and reclaimers, mixing drums, high intensity mixers, etc. Wet agglomeration may be carried out in granulation/balling discs and drums. Thermal agglomeration may be carried out in moving/static thermal agglomeration devices such as horizontal moving grate/strand, rotary kiln, vertical shaft kiln, etc.

The quality of agglomerates obtained from the agglomeration processes strongly influences the efficacy of the subsequent metal extraction processes. The quality and yield of agglomerates in turn depends on various factors such as size distribution and chemical composition of individual feed materials, output of blending operation (size distribution, chemical composition and moisture content of feed mix), output of wet agglomeration operation (particle size distribution, moisture content and composition of green mix/balls), thermal agglomeration process operating conditions (strand speed, firing temperature, furnace pressure, etc.) and external factors such as ambient temperature.

Agglomeration processes are quite sensitive to the input feed material characteristics such as composition, size distribution and density. Typically, these characteristics varies widely and frequently, thereby affecting the yield and productivity of the process, agglomerate quality and stability of the plant making it difficult for the agglomeration plant to operate at its optimum level. Thus, end-to-end process monitoring and optimization of all the units involved in agglomeration is crucial to attain maximum plant efficacy.

Additionally, lack of real-time measurement of key process parameters such as agglomerate quality and composition, productivity, particle size distribution (PSD) of wet agglomerates, and green bed permeability or voidage due to sampling constraints, absence of instruments and long laboratory test times makes it difficult to track the process behavior in real-time. Lack of such critical information makes it difficult to optimize the key parameters like productivity, product quality, energy consumption, percentage uptime, etc.

There have been some efforts to apply data analytics, process monitoring and process optimization to agglomeration processes. Various efforts have been made to model the wet agglomeration and thermal agglomeration processes individually. For the thermal agglomeration process, physics-based models ranging from basic 1-D models to detailed 3-D models have been developed.

SUMMARY

Embodiments of the present disclosure present technological improvements as solutions to one or more of the above-mentioned technical problems recognized by the inventors in conventional systems. For example, in one embodiment, a system for optimizing the operation of an agglomeration plant is provided. The system comprises an input/output interface, a memory and one or more hardware processors. The input/output interface receives a plurality of data as an input from one or more data sources of the agglomeration plant at a pre-determined frequency, wherein the plurality of data comprises of a real-time and non-real-time data. The memory in communication with the one or more hardware processors, wherein the one or more first hardware processors are configured to execute programmed instructions stored in the one or more first memories, to: preprocess the plurality of data; obtain simulated data using the preprocessed data and a plurality of soft sensors, wherein the simulated data is integrated with preprocessed data to obtain integrated data; determine a first set of parameters using a physics-based wet agglomeration model and the integrated data; determine a second set of parameters using physics-based and data-driven charging models, the first set of parameters and the integrated data; determine a third set of parameters using a physics-based thermal agglomeration model, the first set of parameters, the second set of parameters and the integrated data; determine a final set of parameters using a plurality of data-driven models, the first, the second and the third set of parameters, and the integrated data; configure an optimizer using the plurality of physics-based and data-driven models of the agglomeration plant to optimize a plurality of key performance parameters of the agglomeration plant; generate at least one recommendation using the configured optimizer, wherein the recommendations comprise of optimal settings of a plurality of manipulated variables; and provide the generated recommendations to optimize the key performance parameters of the agglomeration plant.

In another aspect, a method for optimizing the operation of an agglomeration plant is provided. Initially, a plurality of data is received as an input from one or more data sources of the agglomeration plant at a predetermined frequency, wherein the plurality of data comprises of a real-time and non-real-time data. The plurality of data is then preprocessed. Further, simulated data is obtained using the preprocessed data and a plurality of soft sensors, wherein the simulated data is integrated with preprocessed data to obtain integrated data. In the next step, a first set of parameters is determined using a physics-based wet agglomeration model and the integrated data. Further, a second set of parameters is determined using physics-based and data-driven charging models, the first set of parameters and the integrated data. In the next step, a third set of parameters is determined using a physics-based thermal agglomeration model, the first set of parameters, the second set of parameters and the integrated data. Further, a final set of parameters is determined using a plurality of data-driven models, the first, the second and the third set of parameters, and the integrated data. In the next step, an optimizer is configured using the plurality of physics-based and data-driven models of the agglomeration plant to optimize a plurality of key performance parameters of the agglomeration plant. Later, at least one recommendation is generated using the configured optimizer, wherein the recommendations comprise of optimal settings of a plurality of manipulated variables. And finally, the generated recommendations are provided to optimize the key performance parameters of the agglomeration plant.

In yet another aspect, one or more non-transitory machine readable information storage mediums comprising one or more instructions which when executed by one or more hardware processors cause optimizing the operation of an agglomeration plant. Initially, a plurality of data is received as an input from one or more data sources of the agglomeration plant at a predetermined frequency, wherein the plurality of data comprises of a real-time and non-real-time data. The plurality of data is then preprocessed. Further, simulated data is obtained using the preprocessed data and a plurality of soft sensors, wherein the simulated data is integrated with preprocessed data to obtain integrated data. In the next step, a first set of parameters is determined using a physics-based wet agglomeration model and the integrated data. Further, a second set of parameters is determined using physics-based and data-driven charging models, the first set of parameters and the integrated data. In the next step, a third set of parameters is determined using a physics-based thermal agglomeration model, the first set of parameters, the second set of parameters and the integrated data. Further, a final set of parameters is determined using a plurality of data-driven models, the first, the second and the third set of parameters, and the integrated data. In the next step, an optimizer is configured using the plurality of physics-based and data-driven models of the agglomeration plant to optimize a plurality of key performance parameters of the agglomeration plant. Later, at least one recommendation is generated using the configured optimizer, wherein the recommendations comprise of optimal settings of a plurality of manipulated variables. And finally, the generated recommendations are provided to optimize the key performance parameters of the agglomeration plant.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
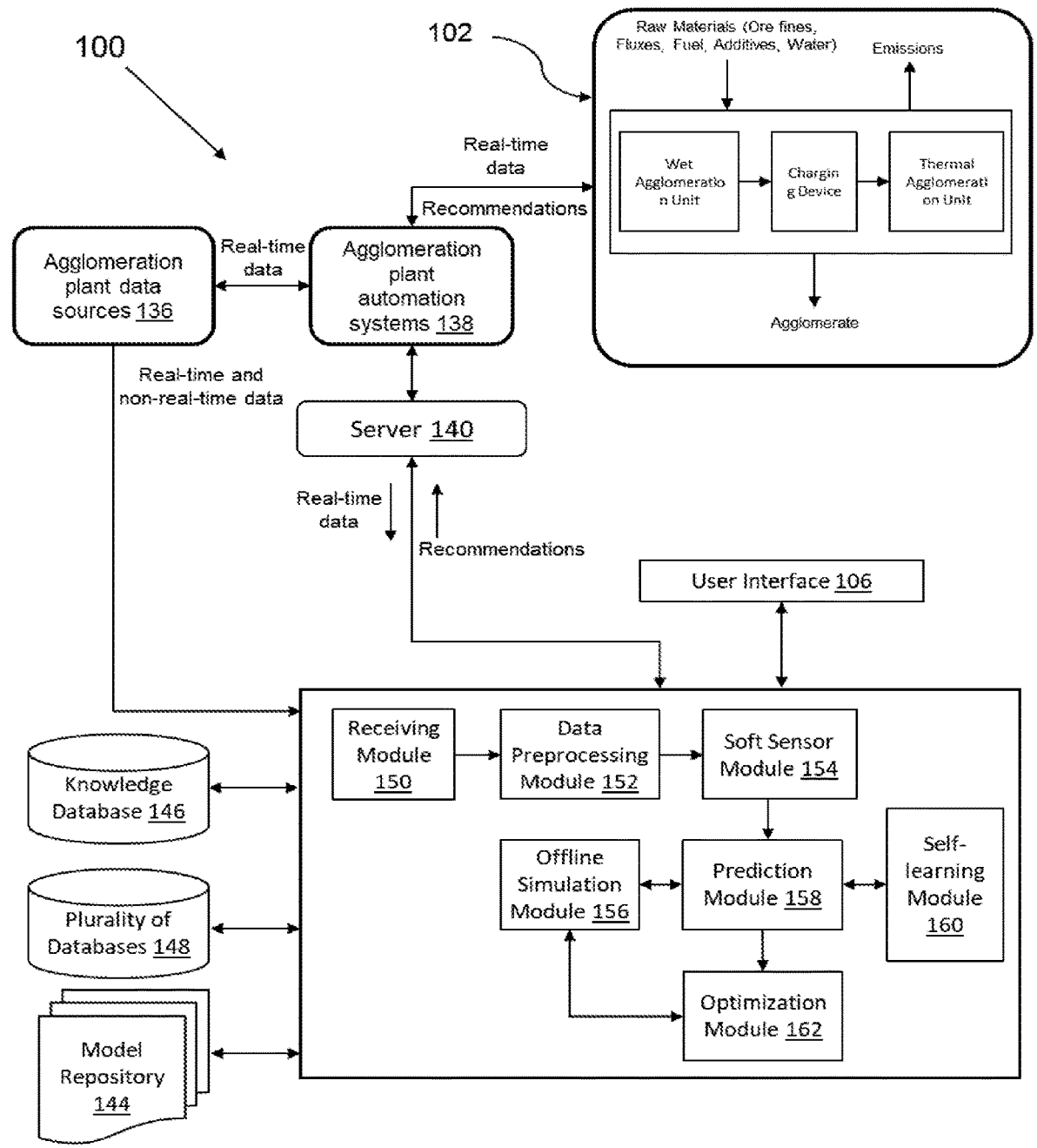
FIG. 1 is a block diagram of the system for optimizing the operation of an agglomeration plant according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Agglomeration process in agglomeration plants are quite sensitive to the input feed material characteristics such as chemical composition, microstructure, size distribution and density. Typically, these characteristics varies widely and frequently, thereby affecting the yield and productivity of the process, agglomerate quality and stability of the plant making it difficult for the agglomeration plant to operate at its optimum level. Additionally, lack of real-time measurement of key process parameters such as agglomerate quality and composition, productivity, particle size distribution of wet agglomerates, and green bed permeability and voidage due to sampling constraints, absence of instruments and long laboratory test times makes it difficult to track the process behavior in real-time. Lack of such critical information makes it difficult to optimize the key parameters like productivity, product quality, energy consumption, percentage uptime, etc.

Process optimization of the thermal agglomeration unit for maximizing the productivity while maintaining the fired agglomerate quality has been explored. However, end-to-end optimization of the agglomerate process by combing all the units involved has not been attempted, possibly due to unique complexities and challenges associated with combining the individual process outputs.

Thus the present disclosure provides a method and system for optimizing the operation of an agglomeration plant. The system performs end-to-end real time optimization on integrated thermal agglomeration and wet agglomeration process which subsequently increases the process productivity and minimizes the operating cost and emissions while maintaining the output product quality. The optimization process involves various steps such as receiving data, pre-processing of data, prediction using physics-based and data-driven models of the agglomeration plant, and optimization configuration and execution. The process also involves continuous monitoring of model performance and self-learning of the models in case of drift. The system is also configured to estimate the key performance indicators (KPIs) of the agglomeration plant such as particle size distribution of wet agglomerates, bed permeability, temperature profile of the thermal agglomeration unit, plant productivity, fuel consumption and product quality in real-time. The system is also configured to provide a model-based multi-objective constrained optimization framework to optimize the key performance indicators of the agglomeration plant.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

According to an embodiment of the disclosure, a block diagram of a system 100 for optimization the operation of an agglomeration plant 102 is shown in FIG. 1. The agglomeration plant 102 comprises wet agglomeration, charging device and thermal agglomeration process of ores such as iron ore, zinc ore, manganese ore and lead ore. The system 100 can be used for real-time optimization of the wet agglomeration unit, the thermal agglomeration unit or the entire agglomeration plant.

According to an embodiment of the disclosure, the system 100 includes a physics-based models of the wet agglomeration unit and the thermal agglomeration unit. These models are developed considering all possible macro or micro processes of all species taking place in the units, and are tuned and validated with historical data from the agglomeration plant. In addition, the system 100 also includes data-based models for key process parameters and soft sensors of the agglomeration plant. These models are trained and validated using historical data of the agglomeration plant.

Figure 2:
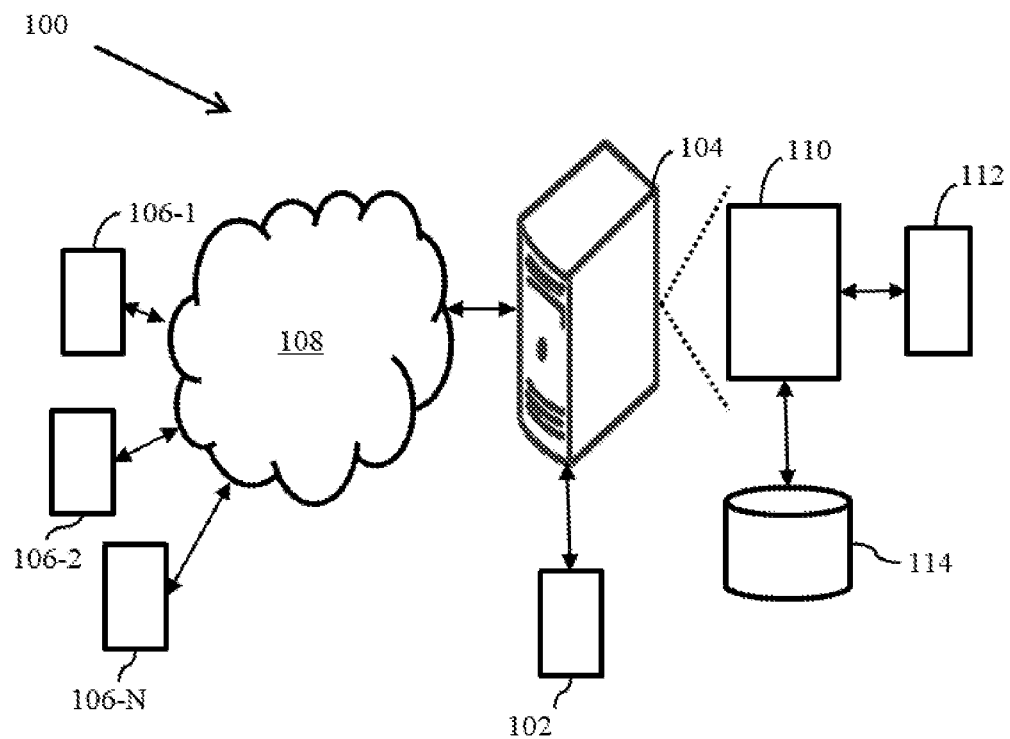
FIG. 2 is a network diagram of the system for optimizing the operation of an agglomeration plant according to some embodiments of the present disclosure.

According to an embodiment of the disclosure, a network diagram (architectural view) of the system 100 for optimization of the agglomeration plant 102 is shown in FIG. 2. It may be understood that the system 100 may comprises one or more computing devices 104, such as a laptop computer, a desktop computer, a notebook, a workstation, a cloud-based computing environment and the like. It will be understood that the system 100 may be accessed through one or more input/output interfaces 106-1, 106-2 . . . 106-N, collectively referred to as I/O interface 106. Examples of the I/O interface 106 may include, but are not limited to, a user interface, a portable computer, a personal digital assistant, a handheld device, a smartphone, a tablet computer, a workstation and the like. The I/O interface 106 are communicatively coupled to the system 100 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links.

In an embodiment, the computing device 104 further comprises one or more hardware processors 110, hereinafter referred as a processor 110, one or more memory 112, hereinafter referred as a memory 112 and a data repository 114 or a database 114, for example, a repository 114. The memory 112 is in communication with the one or more hardware processors 110, wherein the one or more hardware processors 110 are configured to execute programmed instructions stored in the memory 112, to perform various functions as explained in the later part of the disclosure. The repository 114 may store data processed, received, and generated by the system 100.

The system 110 supports various connectivity options such as BLUETOOTH®, USB, ZigBee and other cellular services. The network environment enables connection of various components of the system 110 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 110 are described further in detail.

Figure 3:
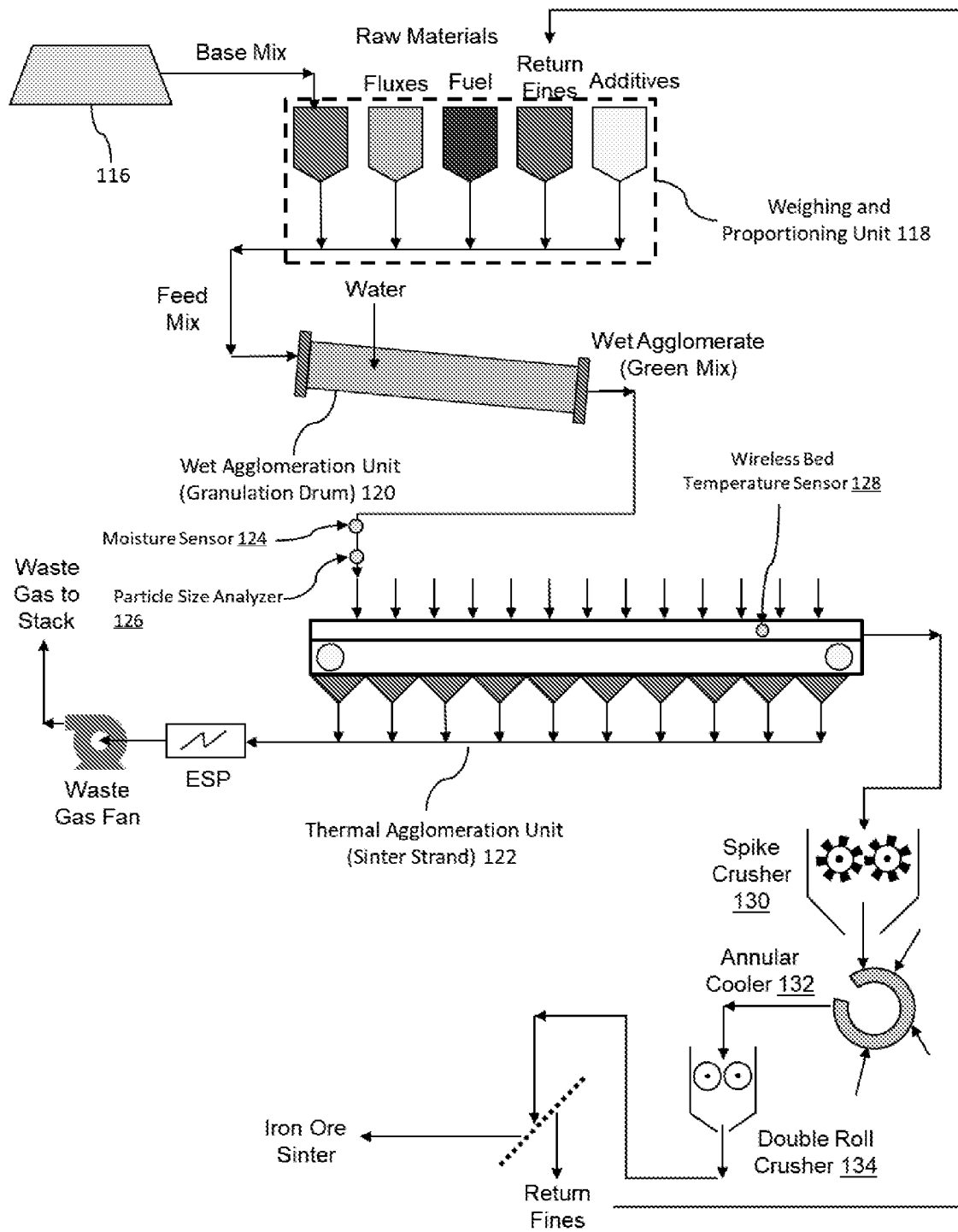
FIG. 3 illustrates a process flow diagram of the agglomeration process in an ore sintering plant shown FIG. 2 according to an embodiment of the present disclosure.

According to an embodiment of the disclosure, FIG. 3 illustrates a process flow diagram of the agglomeration process in the agglomeration plant 102. In an example, the agglomeration plant 102 is an iron ore sintering plant. Input raw materials consisting of iron ore fines (<10 mm in size), fluxes (<3 mm in size), solid fuel (<3 mm in size), undersized agglomerate fines (known as return fines) and iron bearing wastes from other processing units in the metal extraction industry are blended in predetermined proportions in such a way that the chemical composition of the agglomerate meets specified thresholds. Fluxes are used to provide chemical species such as CaO and MgO required for the subsequent metal extraction process. Solid fuel is used to provide thermal energy required for the agglomeration process. Undersized agglomerate fines and iron bearing wastes are recycled via the agglomeration plant. The blended raw materials, typically known as base mix, are typically layered into a stockpile 116. The base mix from the stockpile 116 is reclaimed and conveyed to a weighing and proportioning unit 118. In this unit, the base mix and other trimming materials such as fluxes, solid fuel, return fines and additives are continuously withdrawn from stock bins in predetermined proportions and fed to a rotating granulation drum 120. Additives such as calcined lime are added to improve the quality of the wet agglomerate. In the granulation drum, water is added continuously at a pre-determined flow rate to facilitate wet agglomeration, i.e., mixing and nodulizing of all the raw materials. The output from the granulation drum is green mix that has a narrower particle size distribution compared to that of the feed mix to the drum.

The green mix are further subjected to a thermal agglomeration process. The thermal agglomeration, known as sintering, is carried out in a long horizontal moving strand 122 consisting of pallet cars equipped with grate bars at the bottom. The green mix in continuously charged on the pallet cars of the moving strand at a predetermined flow rate and up to a predetermined bed height using a charging device, typically a rolling feed drum. After the green mix is charged, the top portion of the bed is ignited at high temperatures (>1100° C.) to initiate combustion of the solid fuel present in the green mix. Suction is continuously applied across the height of the bed using a waste gas fan leading to flow of air along the height of the bed. The flow air facilitates combustion of fuel in the green mix in the moving strand. During the thermal agglomeration process, the green mix undergo thermal-chemical processes such as drying of moisture, combustion, calcination of fluxes, melting and solidification. The energy required for the thermal agglomeration process is supplied from the combustion of solid fuel. The output from the thermal agglomeration unit is a sinter cake at high temperature. The sinter cake is crushed in a spike crusher 130 and the crushed sinter chunks are air-cooled in an annual cooler 132. The size of cooled sinter chunks is further reduced to typically less than 40 mm in a double roll crusher 134. The output from the double roll crusher is screened remove undersized sinter (typically less than 5-6 mm) that is recycled, hearth layer (typically 10-25 mm) that is used in the sinter strand and product sinter (typically 5-40 mm) that is transported to the subsequent metal extraction process. The flue/waste gas from the thermal agglomeration unit (sinter strand) is cleaned using bag filters or electrostatic precipitators (ESPs) to remove fine dust particles. The cleaned flue gas is vented from the stack.

The process variables related to the granulation operation such as base mix flow rate, fuel flow rate, flux flow rate, binder flow rate, water flow rate, feed composition and size distribution from laboratory measurement, and process variables related to the sinter strand such as strand speed, suction pressure, firing/ignition temperature, bed height, etc. are fed to the programmable logic controller (PLC) or distributed control system (DCS) and SCADA to control the plant.

Agglomeration of ores is also carried out in pelletization plants via a process called pelletization. This process is suitable for ore fines less than 150 microns in size. The pelletization plant consists of a mixing and blending unit where raw materials such as iron ore fines, fluxes and solid fuel are thoroughly mixed in predetermined proportions. If the size of raw materials is not in the desired range (typically less than 150 microns), size reduction may be carried out in a grinding circuit. The feed mix is continuously fed to a balling disc or drum where water is added at a predetermined flow rate to facilitate the growth of green balls. The green balls or pellets are discharged from the balling disc and charged up to a certain height using a charging device into an induration furnace that consists of a moving strand pallet cars equipped with grate bars at the bottom. In the induration process, the green balls experience various thermo-physical phenomena such as drying, calcination, combustion, melting and solidification, fusion bonding and cooling. The energy required for induration of pellets is supplied externally via a high temperature flue gas generated by combustion of fuels such as natural gas or coal tar. The heat-hardened pellets from the induration furnace are screened to remove undersized material and product pellets (typically 9 to 16 mm in size) are transported to the subsequent metal extraction process.

In addition, the agglomeration plant 102 consist of a plurality of key sensors such as a moisture sensor 124, a particle size analyzer 126 and a wireless bed temperature sensor 128. The moisture sensor 124 is configured to measure real-time water/moisture content of the wet agglomerates. The particle size analyzer 126 is configured to provide real-time size distribution of wet agglomerates. The wireless bed temperature sensor 128 is configured to provide real-time temperature at different heights and lengths of the thermal agglomeration unit.

According to an embodiment of the disclosure, a block diagram of the system 100 for optimization of the agglomeration plant 102 is shown in FIG. 1. The system 100 comprises a plurality of modules for performing various functions. The plurality of modules work in combination for real-time monitoring and optimization of the ore agglomeration plant 102. The system 100 comprises a plurality of agglomeration plant data sources 136, an agglomeration plant automation system 138 or distributed control system (DCS) 138, a server 140, a real-time monitoring and process optimization (RTMO) module 142, a model repository 144, a knowledge database 146, a plurality of databases 148 and the I/O interface 106 of FIG. 2. It should be appreciated that the model repository 144, the knowledge database 146 and the plurality of databases 148 could be the part of the data repository 114 of FIG. 2.

In the preferred embodiment, the distributed control system 138 or the agglomeration plant automation system 138 operates the agglomeration plant 102 in a prescribed manner such that the agglomeration plant 102 meets the required throughput demand from the subsequent metal extraction process while keeping operations safe and optimal in terms of agglomerate yield and overall fuel consumption, and quality of agglomerates and emissions from the plant being within prescribed limits. The agglomeration plant automation system 138 interacts with various respective agglomeration data sources 136 which comprises of a historian, manufacturing execution system (MES) and a laboratory information management system (LIMS), and saves the real-time data within these data sources. The agglomeration plant automation system 138 also interacts with the real-time monitoring and process optimization (RTMO) module 142 through the server 140 such as an OPC server. The real-time monitoring and process optimization module 142 receives real-time data from the agglomeration plant automation system 138 via the server 140, the real-time and non-real-time data from the plurality of agglomeration plant data sources 136, and other relevant information from the plurality of databases 148, the knowledge database 146 and the model repository 144.

According to an embodiment of the disclosure, referring to FIG. 1, the knowledge database 146 constitutes process knowledge and user knowledge derived from one or more modules of the real-time process optimization module 142. It comprises knowledge derived from multitude of simulations performed by the offline simulation module, knowledge of influence of various raw materials on the agglomeration plant, performance information of the plurality of physics-based and data-driven models of the agglomeration plant, and diagnostics information or fault trees for common process and equipment in the plant. The knowledge database is used by a plurality of modules of the real-time optimization module.

According to an embodiment of the disclosure, referring to FIG. 1, the plurality of databases 148 comprise static and dynamic information pertaining to the agglomeration plant. The databases comprise a material database that contains static properties of raw materials, intermediate products, byproducts, final product and emissions, etc., an equipment database that contains equipment design data, details of construction materials, etc., a process configuration database that contains of process flowsheets, equipment layout, control and instrumentation diagrams, etc., an algorithm databases that contains algorithms and techniques of data-driven and physics-based models, and solvers for physics-based models and optimization problems. The databases further comprise an operations database that contains sensor data, a laboratory database that contains of properties of raw materials, intermediate products, byproducts, final products and emissions obtained via tests at the laboratories, a maintenance database that consists of condition of the process, health of the equipment, maintenance records indicating corrective or remedial actions on various equipment, etc., an environment database that consists of weather and climate data such as ambient temperature, atmospheric pressure, humidity, etc.

According to an embodiment of the disclosure, referring to FIG. 1, the model repository 144 comprises physics-based models, data-driven models, soft sensor models and configured optimization models of the agglomeration plant.

According to an embodiment of the disclosure, the real-time monitoring and process optimization module 142 comprises a plurality of modules. The plurality of modules comprises a receiving module 150, a data preprocessing module 152, a soft sensor module 154, an offline simulation module 156, a prediction module 158, a self-learning module 160 and an optimization module 162. The receiving module 150 is configured to receive the plurality of real-time data from the server 140 and real-time and non-real-time data from the agglomeration plant data sources 136 at a pre-determined frequency as an input. Data may be configured to be received at a frequency of once in every 1 min, once in every 5 min, etc. Real-time data comprises operations data such as temperatures, pressures, flow rates, levels, valve opening percentages, vibrations, chemical composition of gases, dust levels, power consumption, motor currents, motor RPM, etc. measured in different units of the agglomeration unit such as the weighing and proportioning unit, the mixing and blending unit, the wet agglomeration unit, the charging device, the thermal agglomeration unit, the cooling unit, the screening and sizing unit, and the gas cleaning unit. It also comprises environment data such as ambient temperature, atmospheric pressure, ambient humidity, rainfall, etc. The non-real-time includes data from laboratory tests and maintenance activities. Laboratory data consists of chemical composition, particle size distribution, density and microstructure information of raw materials, wet agglomerates and agglomerates. It also comprises results from quality tests such as tumbler index, abrasion index cold compressive strength, reduction degradation index, reducibility index and softening-melting conducted on agglomerates. The maintenance data includes details of planned and unplanned maintenance activities performed on one or more units of the plant, and condition and health of the process and various units in the plant. Real-time data is obtained from plant automation systems such as distributed control system (DCS) via a communication server such as OPC server or via an operations data source such as a historian. The non-real-time data is obtained from LIMS, MES, historian and other plant maintenance databases. In a typical agglomeration plant, the total number of variables from various data sources can be between 300 and 600.

The data preprocessing module 152 is configured to pre-process the received data. The preprocessing of data comprises identification and removal of outliers, imputation of missing data, and synchronization and integration of a plurality of variables from one or more data sources using the residence time of all the units of the agglomeration plant. The sampling frequency of real-time and non-real-time data may be unified to, for example, once every 1 min, where the real-time data is averaged as necessary and the non-real-time data is interpolated or replicated as necessary.

The soft sensor module 154 is configured to obtain simulated data that is not generated by the physical sensors of the plant. The module uses the pre-processed data and a plurality of soft sensors to generate simulated data. The soft sensor module 154 comprises physics-based and data-driven soft sensors comprising of flow rates of input feed materials to the agglomeration plant, size distribution of input feed mix, mean diameter of input feed mix, chemical composition of input feed mix and moisture content of input feed mix. The module is further configured to combine simulated data and pre-processed data to obtain integrated data. The integrated data is further used to provide services such as prediction, process optimization, continuous monitoring and self-learning as explained in the later part of the disclosure.

According to an embodiment of the disclosure, the offline simulation module 156 performs simulation tasks on the agglomeration plant 102 that are not required or not possible in real-time owing to the complexity of the system but are useful to be performed at a regular intervals. The offline simulation module 156 generates specific test instances for simulation that are simulated using high fidelity physics-based models and data-driven models. These modules provides insights into overall operation of the agglomeration plant 102. Simulation from offline simulation module may be requested by the prediction module, the process optimization module or the self-learning module. The offline simulation module interacts with the plurality of databases 148, the knowledge database 146 and the model repository 144. The information processed by the offline simulation module 156 is stored in the plurality of databases 148.

Figure 4:
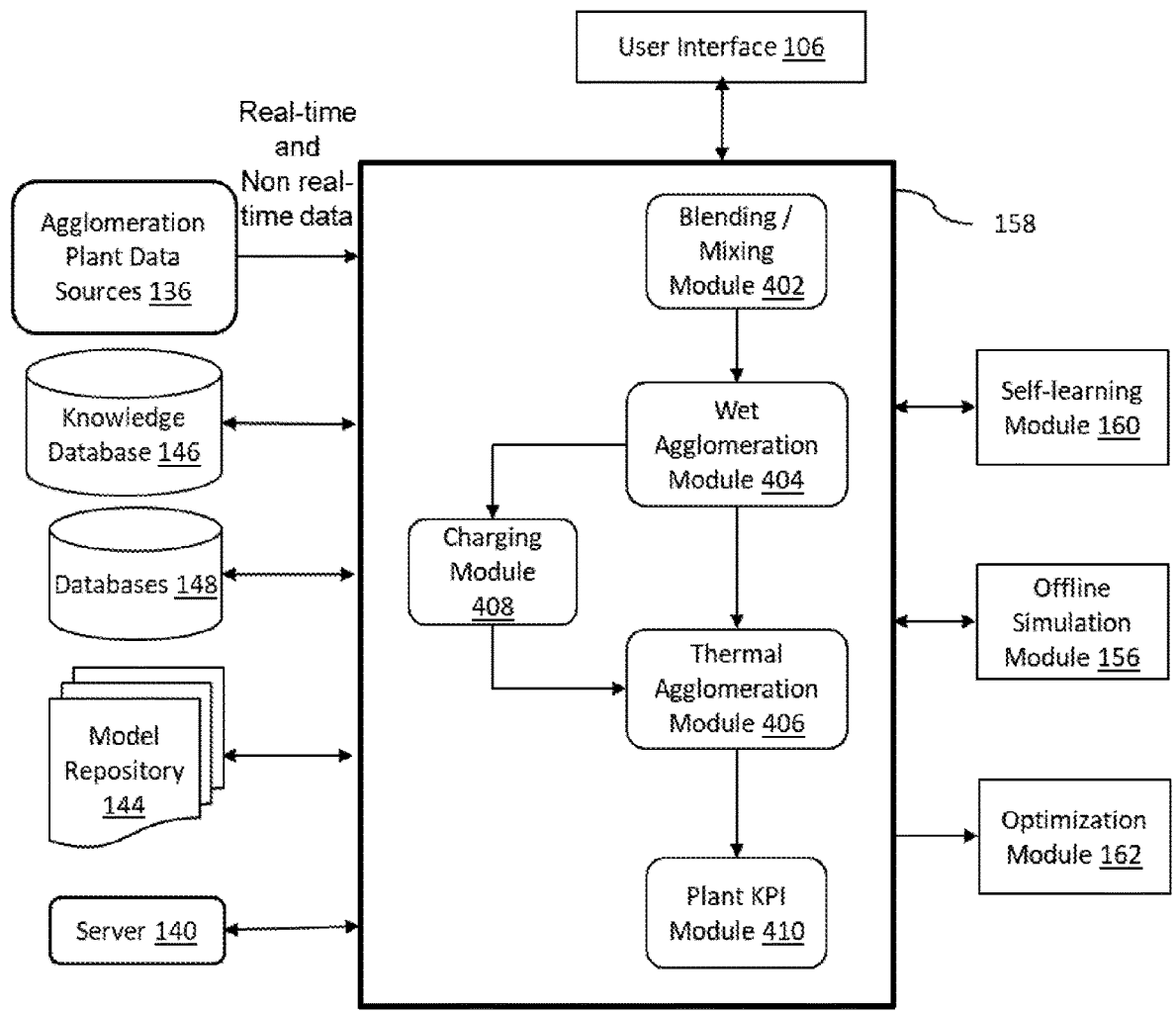
FIG. 4 is a block diagram of a prediction module of the system of FIG. 1 according to an embodiment of the present disclosure.

According to an embodiment of the disclosure, a block diagram of the prediction module 158 is shown in the FIG. 4. The prediction module 158 further comprises a blending/mixing module 402, a wet agglomeration module 404, a thermal agglomeration module 406, a charging module 408 and a plant KPI module 410. The prediction module 158 is also in communication with the user interface 106, the plurality of databases 148, the knowledge database 146, the agglomeration plant data sources 136, the self-learning module 160, the offline simulation module 156 and the optimization module 162.

According to an embodiment of the disclosure, the blending/mixing module 402 is configured to predict the chemical composition, particle size distribution and moisture/water content of the feed mix given the flow rates or proportion in which the raw materials are mixed. The raw materials comprise ore fines, solid fuel, fluxes, return fines, additives, solid wastes, etc. The chemical composition comprises metallic species such as Fe, Mn, Zn, Pb, etc. and oxide species such as $FeO_x$, $MnO_x$, $ZnO_x$, $PbO_x$, CaO, $SiO_2$, MgO, $Al_2O_3$, $Cr_2O_3$, etc. and carbon.

According to an embodiment of the disclosure, the wet agglomeration module 404 is configured to determine a first set of parameters using a physics-based and data-driven wet agglomeration models and the integrated data. The wet agglomeration model comprises algebraic equations representing the mixing and particle layering process taking place inside the wet agglomeration unit and could be a population balance model. The first set of parameters comprises size distribution, mean diameter, water content, D50, D80 and granulation index of the wet agglomerate. The wet agglomerate refers to green mix in case of sintering and green balls in case of pelletization.

According to an embodiment of the disclosure, the charging module 408 is configured to determine a second set of parameters using physics-based and data-driven charging models, the first set of parameters and the integrated data. The physics-based charging model comprises the relationship among the mean diameter of wet agglomerate, the height of wet agglomerate in the thermal agglomeration unit, pressure difference across the bed, velocity of air through the bed and voidage of the bed, and could be modified Ergun equation and Japanese Permeability equation, etc. The second set of parameters comprises voidage and permeability of the wet agglomerate bed, the velocity of air through the bed and the size and species segregation profile of bed.

Figure 8:
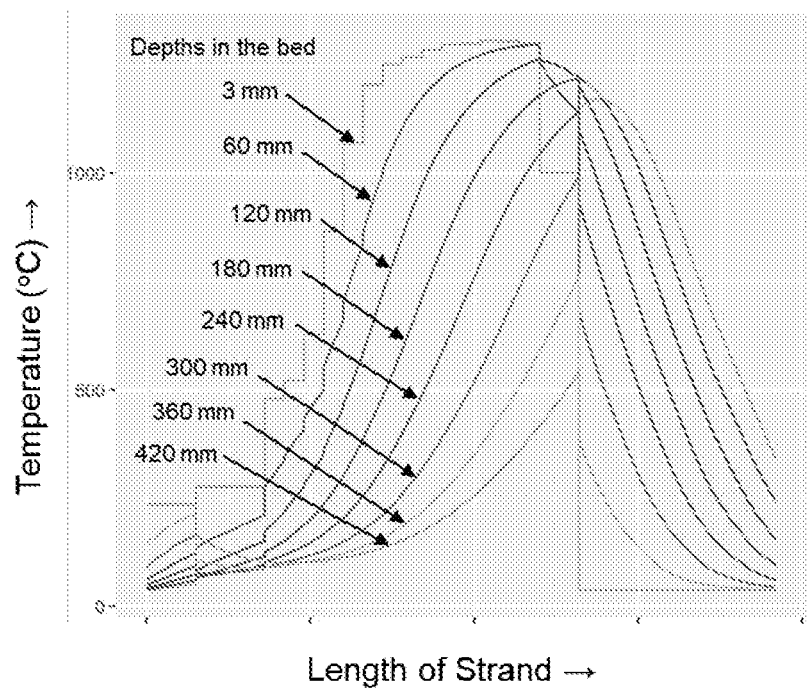
FIG. 8 is the graphical representation of the temperature profiles obtained from the thermal agglomeration model according to an embodiment of the present disclosure.

According to an embodiment of the disclosure, the thermal agglomeration module 406 is configured to determine a third set of parameters using a physics-based thermal agglomeration model, the first set of parameters, the second set of parameters and the integrated data. The thermal agglomeration model comprises nonlinear differential and algebraic equations representing the various physical-chemical phenomena and reactions occurring in the thermal agglomeration unit. The phenomena modeled by the thermal agglomeration model include evaporation and condensation of water, calcination of fluxes, combustion of solid fuel, Boudouard reaction, reduction of metallic oxides, re-oxidation of metallic oxides, melting and solidification. The third set of parameters comprises distributions of temperature and a plurality of chemical species at different heights of the bed and lengths of the thermal agglomeration unit, the velocity and flow rate of inlet air and gas at different lengths of the thermal agglomeration unit, temperature, velocity and flow rate of outlet gas from different lengths of the thermal agglomeration unit, the velocity and thickness of the flame front at different lengths of the thermal agglomeration unit, temperature and flow rate of the exhaust gas at different lengths of the thermal agglomeration unit, length and location of burn through point in the thermal agglomeration unit, and temperature of agglomerate discharged from the thermal agglomeration unit. The chemical species comprise metallic species such as Fe, Mn, Zn, Pb, etc. and oxide species such as $FeO_x$, $MnO_x$, $ZnO_x$, $PbO_x$, CaO, $SiO_2$, MgO, $Al_2O_3$, $Cr_2O_3$, etc., carbon, liquid moisture and water vapor. Typical temperature profiles obtained from the thermal agglomeration model at different bed heights and along the length of the thermal agglomeration unit in a pelletization plant, i.e. induration furnace are depicted in FIG. 8. It can be observed that the agglomerates at the bottom of the bed experience lower temperatures compared to those at the top of the bed.

According to an embodiment of the disclosure, the plant KPI module 410 is configured to determine a final set of parameters using a plurality of data-driven models, the first, the second and the third set of parameters, and the integrated data. The final set of parameters comprises productivity, yield, efficiency, fuel rate and percentage of undersized agglomerates from the agglomeration plant, and size distribution, mean diameter, tumbler index, abrasion index, cold compressive strength, reduction degradation index, reducibility index, and softening melting parameters of the agglomerate.

It should be noted that the plurality of data-driven models in the wet agglomeration module, charging module and plant KPI module are built using machine learning and deep learning techniques that include variants of regression (multiple linear regression, stepwise regression, forward regression, backward regression, partial least squares regression, principal component regression, Gaussian process regression, polynomial regression, etc.), decision tree and its variants (random forest, bagging, boosting, bootstrapping), support vector regression, k-nearest neighbors regression, spline fitting or its variants (e.g. multi adaptive regression splines), artificial neural networks and it variants (multi-layer perceptron, recurrent neural networks & its variants e.g. long short term memory networks, and convolutional neural networks) and time series regression models. The models can be point models (that do not consider temporal relationship among data instances) or time series models (that consider temporal relationship among data instances).

Figure 5:
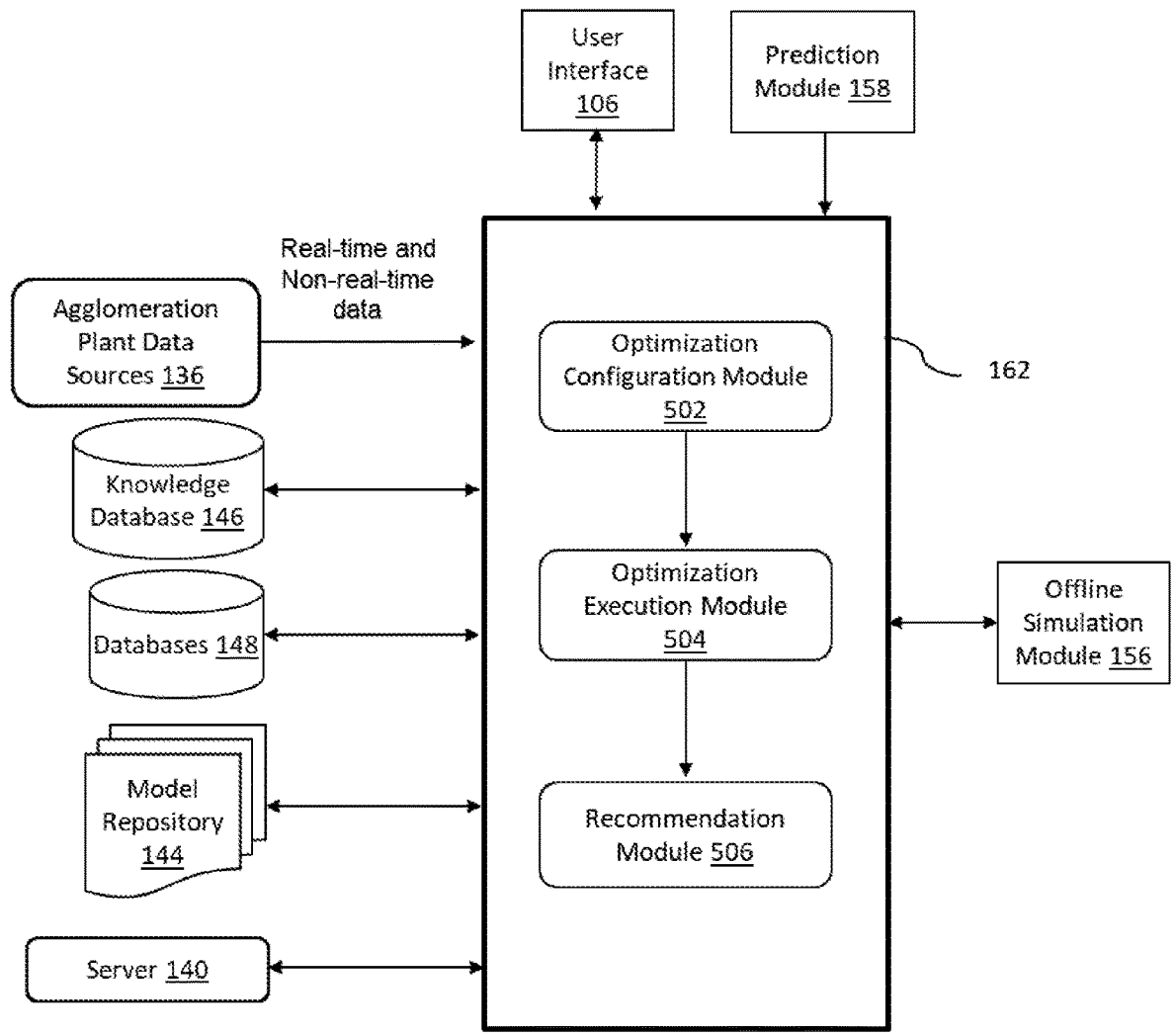
FIG. 5 is a block diagram of an optimization module of the system of FIG. 1 according to an embodiment of the present disclosure.

According to an embodiment of the disclosure a block diagram of the optimization module 162 is shown in FIG. 5. The optimization module 162 is configured to optimize a plurality of key performance parameters of the agglomeration plant 102 using the plurality of physics-based and data-driven models. The plurality of key performance parameters (KPI) of the agglomeration plant 102 comprises throughput, productivity, yield, efficiency, fuel rate and percentage of undersized agglomerates from the agglomeration plant, chemical composition, size distribution, mean diameter, tumbler index, abrasion index, cold compressive strength, reduction degradation index, reducibility index, and softening melting parameters of the agglomerate, granulation index and mean diameter of the wet agglomerate, location of burn through point and maximum wind-box temperature in the thermal agglomeration unit, temperature of waste gas entering the gas cleaning system, percentages of pollutants such as CO, NOx, SOx in the waste gas.

The optimization module 162 further comprises an optimization configuration module 502, an optimization execution module 504 and a recommendation module 506. The optimization configuration module is configured to enable configuring of optimization models/optimizer specific to the agglomeration plant. The optimizer may be configured after a predefined time interval, when the key performance parameters of the agglomeration plant cross the predefined thresholds, or by manual intervention. Configuration of the optimization problem involves choosing the type of optimization problem (single objective vs multi objective), direction of optimization (maximize or minimize), one or more objective functions, one or more constraints and their lower and upper limits, one or more manipulated variables and their lower and upper limits, and one or more groups of manipulated variables. Inputs for configuring the optimization model may be taken from the user via the user interface 106 and the configured optimization models are stored in the model repository 144. The objective functions and constraint functions can be chosen from the plurality of key performance parameters of the agglomeration plant 102. They can also be derived from or be a combination of the plurality of key performance parameters of the plant. A sample optimization problem for the agglomeration plant 102 is:

Objective Function1: max(Productivity)
Objective Function2: max(Tumbler Index)
Constraints
$RDI^L < RDI < RDIA^U$
$RF^L < RF < RF^U$
Manipulated Variables
$H^L < H < H^U$
$SS^L < SS < SS^U$ where RDI is the reduction degradation index of the agglomerate, RF is percentage of return fines or percentage of undersize agglomerate, H is the bed height of the wet agglomerate in the thermal agglomeration and SS is the strand speed. The superscripts L and U refer to the lower and upper limits of the variables.

Figure 9:
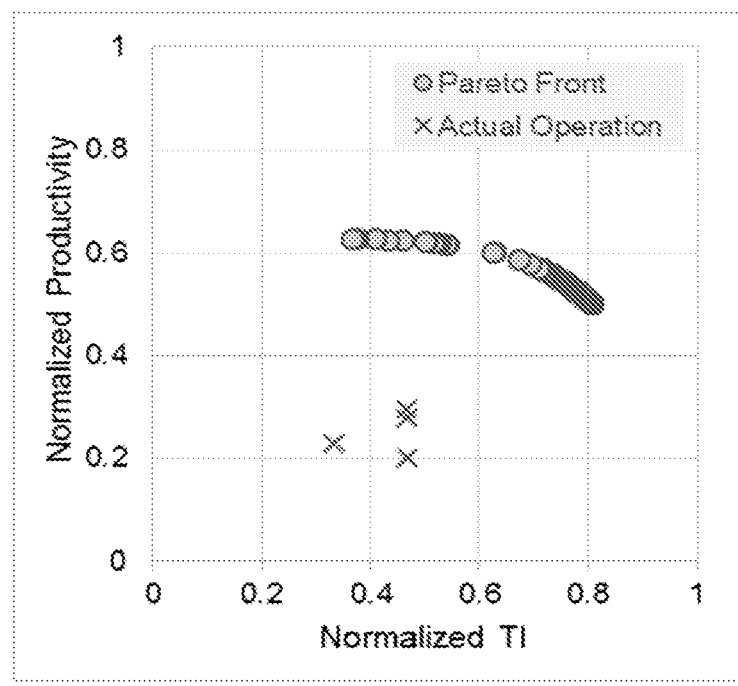
FIG. 9 is graphical representation of sample optimization recommendations in the form of a Pareto chart according to an embodiment of the present disclosure.

The optimization execution module 504 is configured to solve the optimization models saved using the optimization configuration module 502. The optimization execution module 504 utilizes the plurality of physics-based and data-driven models of the key performance indicators and a plurality of optimization solvers to generate one or more recommendations for the agglomeration plant wherein recommendations comprise optimal settings for the manipulated variables configured in the optimization model. The optimization solvers comprise of solvers based on gradient descent, quasi Newton methods and heuristic optimization approaches comprising Particle Swarm Optimization (PSO), genetic algorithms and bee colony optimization. Different units of agglomeration plant 102 have different dynamics. The optimization execution module 504 addresses these different dynamics by utilizing the concept of time-constrained optimization. According to an embodiment of the disclosure, FIG. 9 shows a graphical representation of sample optimization recommendations in the form of a Pareto chart. The Pareto front represents the set of all possible optimal solutions to the optimization model. From FIG. 9, it can be observed that any of the recommendations from the Pareto front would result in higher productivity and higher tumbler index compared to those being obtained from actual/current operation of the agglomeration plant.

In the preferred embodiment, the recommendation module 506 is configured to provide at least one recommendation generated using the configured optimizer to the agglomeration plant via the server 140 and the user interface 106. The recommendations comprise of optimal settings of a plurality of manipulated variables. The generated recommendations are provided to optimize the key performance parameters of the agglomeration plant. The plurality of manipulated variables of the agglomeration plant 102 comprises flow rates of input raw materials, flow rates of additives, flow rate of water, temperature profile in the ignition furnace, flow rate of wet agglomerate, strand speed, bed height of wet agglomerate, and pressure drop in various sections of the thermal agglomeration unit.

Figure 6:
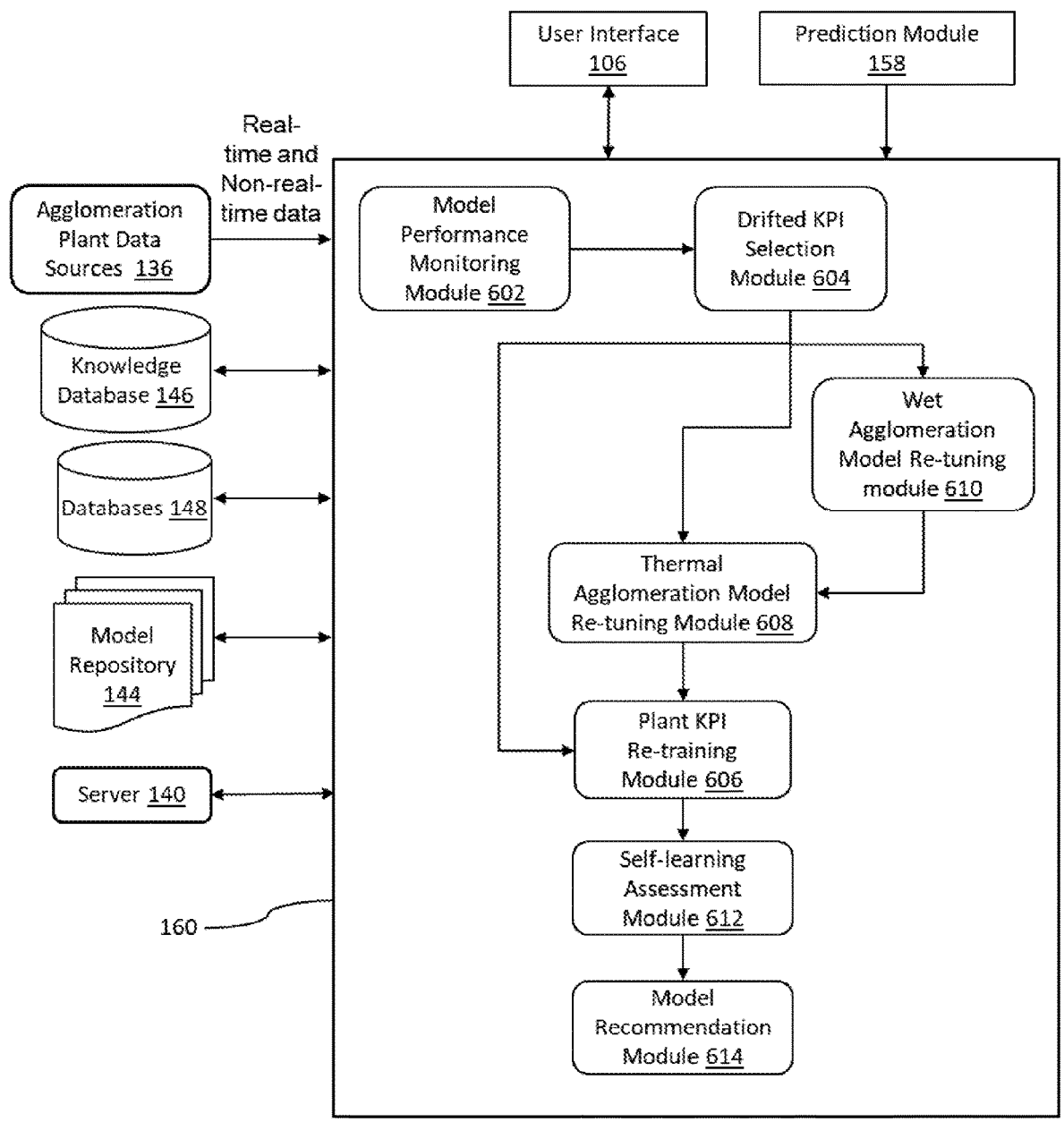
FIG. 6 is a block diagram of a self-learning module of the system of FIG. 1 according to an embodiment of the present disclosure.

According to an embodiment of the disclosure, a block diagram of the self-learning module 160 is shown in FIG. 6. The self-learning module 160 is configured to monitor the performance of the plurality of physics-based and data-driven models of the agglomeration and retune/retrain the models in case of a drift in their performance. For physics-based process models, tunable parameters such as heat transfer coefficients, tuning parameters for reaction rates, tuning parameters for specific heat capabilities of various species, wind box tuning parameters etc. are re-tuned in case of performance drift. For databased models, either the hyper-parameters of the models are re-tuned or models are re-trained in case of a performance drift. The re-tuned and re-trained models are stored in the model repository 144 and may be activated for prediction in the prediction module 158.

According to an embodiment of the disclosure, the self-learning module 160 comprises a model performance monitoring module 602, a drifted KPI selection module 604, a plant KPI re-training module 606, a thermal agglomeration model re-tuning module 608, a wet agglomeration model re-tuning module 610, a self-learning assessment module 612 and a model recommendation module 614. The self-learning module 160 interacts with the agglomeration plant data sources 136, knowledge database 146, plurality of databases 148, model repository 144, the server 140, the prediction module 158 and the user interface 106 as and when required.

The model performance monitoring module 602 is configured to determine the performance of active physics-based and data-driven models of the system 100 by comparing the predictions from the models with their respective measured/actual values. For the physics-based wet agglomeration model, the size distribution, mean diameter and moisture of the wet agglomerate may be compared with the measured values for determining model performance. The measured values may be received intermittently from the laboratory database or periodically from the moisture sensor 124 and particle size analyzer 126. For the physics-based thermal agglomeration model, the temperature distribution at different heights of the bed and lengths in the thermal agglomeration unit, and the temperature of exhaust gas at different lengths of the thermal agglomeration unit may be compared with their corresponding measured values to determine model performance. Measurements of temperature distribution at different heights of the bed and lengths of the thermal agglomeration unit may be obtained from the wireless bed temperature sensor 128. The model performance monitoring module 602 computes a model performance index utilizing the predictions of the models and the corresponding measured variables. The model performance index could be one of:

Error metrics (absolute error, absolute percentage error, root mean square error, etc.)
Percentage of points within ±α % error
Coefficient of determination
Customized performance metrics (e.g. Hit Rate)

If the model performance index exceeds a predefined threshold for any model, the drifted KPI selection module 604 is triggered. The drifted KPI selection module 604 determines the underlying drifted model/models responsible for the higher model performance index. Depending on the model type (data-driven models or physics-based models) and model dependencies, the drifted KPI selection module 604 triggers one of three self-learning methods.

According to an embodiment of the disclosure in the first self-learning method, if the drifted model is one of the plant KPI model such as productivity, fuel rate, yield, agglomerate quality such as tumbler index, reduction degradation index, reducibility index, the plant KPI re-training module 606 is triggered. The plant KPI re-training module 606 provides a data-driven self-learning approach where the model is either re-tuned or re-trained using the recent as well as historical data of the agglomeration plant. In case of re-tuning, the hyper-parameters of the data-driven model are re-learnt using the recent and historical data without changing the underlying learning technique used in the model. In case of re-training, a new data-driven model is built for the plant KPI using a plurality of learning techniques and the recent and historical data.

According to an embodiment of the disclosure in the second self-learning method, if the drifted model is a physics-based model from the thermal agglomeration unit, the thermal agglomeration model re-tuning module 608 is triggered. There could be hundreds of tunable parameters in the physics-based models and all of them cannot be tuned simultaneously due to the large search space. The thermal agglomeration model re-tuning module 608 performs sensitivity analysis of all hyper-parameters with respect to their influence on model predictions and categorizes them into 3 levels with level 1 parameters having the most significant impact on model predictions, followed by level 2 and level 3 parameters. The feasible limits of the tunable parameters may be available in the knowledge database 146 or may be taken from the user.

Herein, level 1 parameters are tuned first using recent and historical data of the agglomeration plant and if the model performance index is not satisfactory, level 2 parameters are tuned. If the model performance index after level 2 tuning is not satisfactory, level 3 parameters are tuned. The selection and rejection of any tuned parameter values are based on their feasible limits and domain knowledge. The tuning of parameters is based on the back propagation technique, where the model predictions are compared with the corresponding measured values and optimum values of tunable parameters are searched in the feasible space in order to minimize the model performance index. Appropriate instances from recent and historical data of the agglomeration plant are chosen to improve the model performance index. Once the re-tuning of thermal agglomeration model re-tuning is completed, the plant KPI re-training module 606 is triggered and the plant KPIs models are appropriately re-trained or re-tuned.

According to an embodiment of the disclosure in the third self-learning method, if the drifted model is a wet agglomeration model or a charging model, the wet agglomeration model re-tuning module 610 is triggered.

The tunable parameters of the wet agglomeration model granule growth ratio, growth coefficients etc. The tuning is based on the back propagation technique, wherein the predictions of wet agglomerate size distribution and mean diameter are compared with the corresponding measured values and optimum values of tuning parameters are searched in the feasible space to minimize the model performance index. Once the wet agglomeration model is re-tuned, the data-driven charging model is re-trained/re-tuned using recent and historical data of the agglomeration plant and outputs from the re-tuned wet agglomeration model. Once the charging model is re-trained, the thermal agglomeration model re-tuning module is triggered followed by the plant KPI re-training module to re-tune the thermal agglomeration model and re-train the plant KPI models respectively.

The output from three modules is provided to the self-learning assessment module 612. The self-learning assessment module 612 compares the model performance indices of each of the plurality of physics-based and data-driven models after self-learning with their respective pre-determined thresholds. If the model performance indices are lower than the predefined thresholds, the model recommendation module 614 is triggered, else the re-tuned and re-trained models s are discarded and the user is notified of the same via the user interface 106. The model recommendation module 614, notifies the user of the re-learnt models and saves the re-learnt models in the model repository 144. The user may choose to activate one or more re-learnt models for predictions.

According to an embodiment of the disclosure, the system 100 further comprises solvers of the physics-based models. For example, a solver (not shown in FIG.) for wet agglomeration model, which may be an algebraic equation solver, an ordinary differential equation solver, and a partial differential equation solver. Similarly, a solver for the charging model which may be an algebraic equation solver and a solver for thermal agglomeration model which may be an algebraic equation solver, an ordinary differential equation solver and a partial differential equation solver.

Figure 7A:
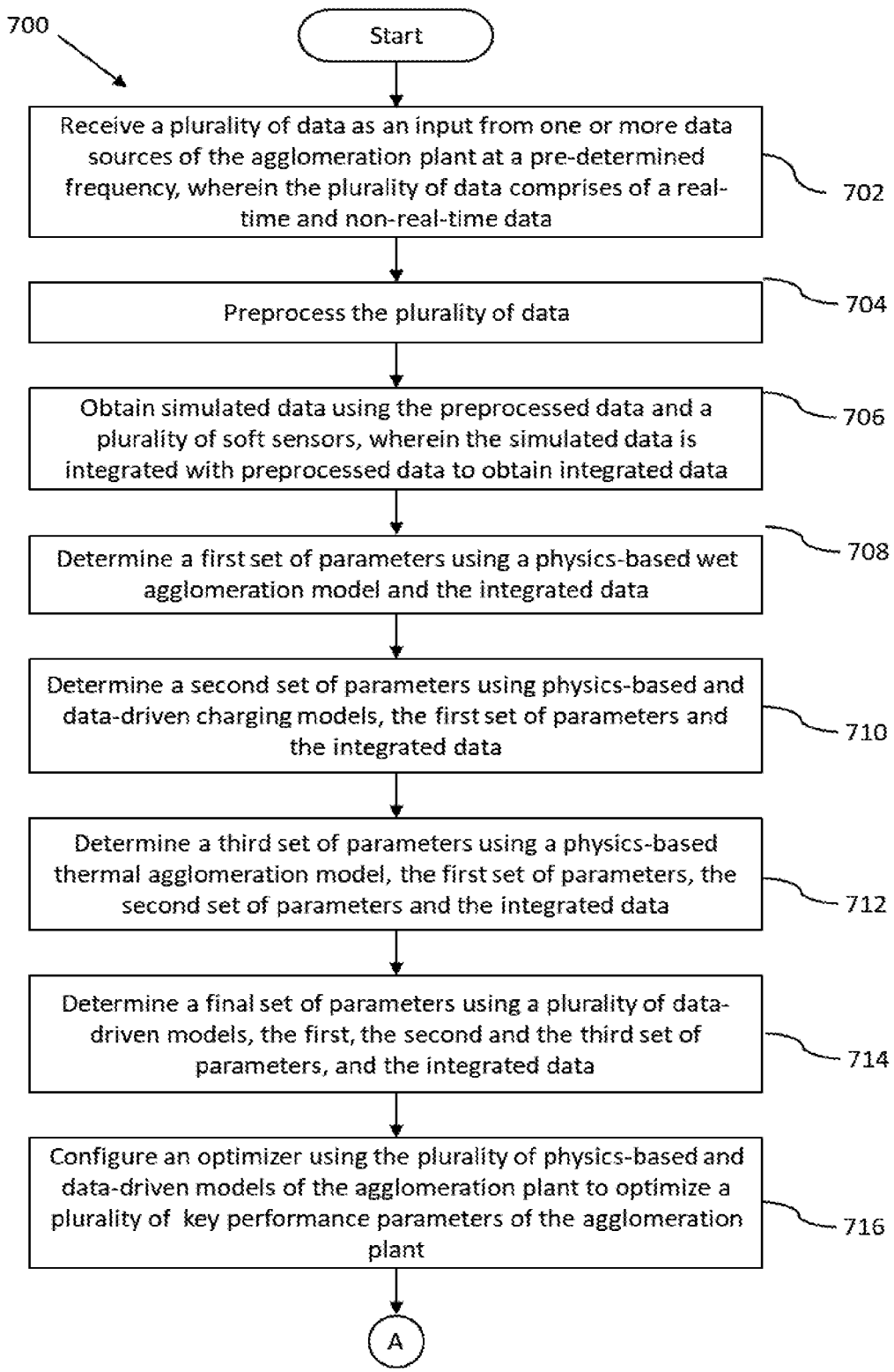
FIG. 7A-7B shows a flowchart illustrating the steps involved in optimizing the operation of the agglomeration plant according to an embodiment of the present disclosure.
Figure 7B:
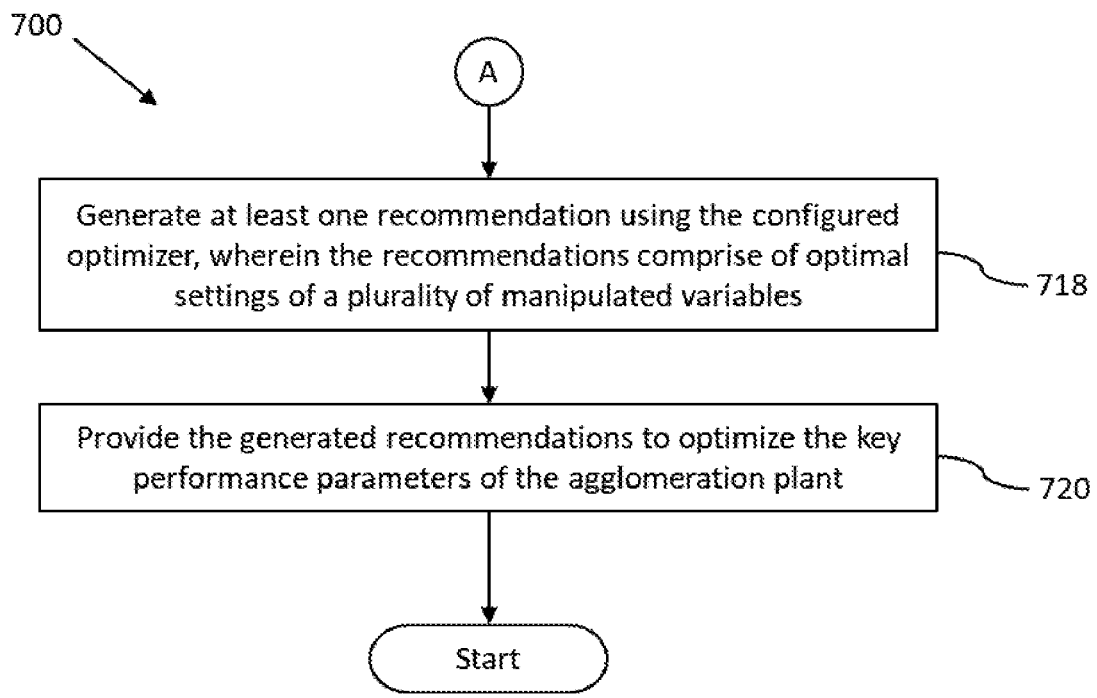

In operation, a flowchart 700 for optimizing the operation of the agglomeration plant 102 is shown in FIG. 7A-7B. Initially at step 702, the plurality of data is received as an input from one or more data sources of the agglomeration plant at a pre-determined frequency, wherein the plurality of data comprises of a real-time and non-real-time data. At step 704 the plurality of data is preprocessed. Later at step 706, simulated data is obtained using the preprocessed data and the plurality of soft sensors. The simulated data is integrated with preprocessed data to obtain integrated data.

At step 708, the first set of parameters are determined using the physics-based wet agglomeration model and the integrated data. The first set of parameters comprises size distribution, mean diameter and water content of a wet agglomerate. At step 710 the second set of parameters is determined using physics-based and data-driven charging models, the first set of parameters and the integrated data. The second set of parameters comprises voidage and permeability of the wet agglomerate bed, the velocity of air through the wet agglomerate bed and the size and species segregation profile of wet agglomerate bed. At step 712, the third set of parameters is determined using the physics-based thermal agglomeration model, the first set of parameters, the second set of parameters and the integrated data. The third set of parameters comprises distributions of temperature and a plurality of chemical species at different heights of the bed and lengths of the thermal agglomeration unit, the velocity and flow rate of inlet air and gas at different lengths of the thermal agglomeration unit, temperature, velocity and flow rate of outlet gas from different lengths of the thermal agglomeration unit, the velocity and thickness of the flame front at different lengths of the thermal agglomeration unit, temperature and flow rate of the exhaust gas at different lengths of the thermal agglomeration unit, length and location of burn through point in the thermal agglomeration unit, and temperature of agglomerate discharged from the thermal agglomeration unit. Further, at step 714, the final set of parameters are determined using the plurality of data-driven models, the first, the second and the third set of parameters, and the integrated data. The final set of parameters comprises productivity, yield, efficiency, fuel rate and percentage of undersized agglomerates from the agglomeration plant, and size distribution, mean diameter, tumbler index, abrasion index, cold compressive strength, reduction degradation index, reducibility index, and softening melting parameters of the agglomerate.

At the next step 716, the optimizer is configured using the plurality of physics-based and data-driven models of the agglomeration plant to optimize a plurality of key performance parameters of the agglomeration plant. Further at step 718, at least one recommendation is generated using the configured optimizer, wherein the recommendations comprise of optimal settings of the plurality of manipulated variables. And finally at step 720, the generated recommendations are provided to optimize the plurality of key performance parameters of the agglomeration plant 102.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of improving the performance and efficiency of the entire agglomeration plant due to the complexity involved in the process. The embodiment, thus provides the method and system for optimizing the operation of an agglomeration plant.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method for optimizing the operation of an agglomeration plant, the method comprising:
receiving a plurality of data as an input from one or more data sources of the agglomeration plant at a predetermined frequency, wherein the plurality of data comprises of a real-time and non-real-time data;
preprocessing, via one or more hardware processors, the plurality of data;
obtaining, via the one or more hardware processors, simulated data using the preprocessed data and a plurality of soft sensors, wherein the simulated data is integrated with preprocessed data to obtain integrated data;
determining, via the one or more hardware processors, a first set of parameters using a physics-based wet agglomeration model and the integrated data;
determining, via the one or more hardware processors, a second set of parameters using physics-based and data-driven charging models, the first set of parameters and the integrated data;
determining, via the one or more hardware processors, a third set of parameters using a physics-based thermal agglomeration model, the first set of parameters, the second set of parameters and the integrated data;
determining, via the one or more hardware processors, a final set of parameters using a plurality of data-driven models, the first, the second and the third set of parameters, and the integrated data;
configuring, via the one or more hardware processors, an optimizer using the plurality of physics-based and data-driven models of the agglomeration plant to optimize a plurality of key performance parameters of the agglomeration plant;
generating, via the one or more hardware processors, at least one recommendation using the configured optimizer, wherein the recommendations comprise of optimal settings of a plurality of manipulated variables, wherein the manipulated variables includes height of the wet agglomerate in the thermal agglomeration from lower to upper limits, a strand speed from lower to higher limits, percentage of return fines or percentage of undersize agglomerate from lower to upper limits and a reduction degradation index (RDI) of the agglomerate from lower to upper limits;
providing, via the one or more hardware processors, the generated recommendations to optimize the key performance parameters of the agglomeration plant; and
monitoring the key performance parameters of the agglomeration plant using self-learning physics-based and data-driven models, re-tune or re-train physics-based and data-driven models of the agglomeration plant, wherein the self-learning physics-based and data-driven models of the agglomeration plant comprising:
computing, via the one or more hardware processors, a model performance index for each of the plurality of physics-based and data-driven models in real-time by comparing the model outputs with the corresponding measured variables, wherein the model performance index includes an error metrics, percentage of points error, a coefficient of determination and a customized performance metrics;

determining, via the one or more hardware processors, the models responsible for model performance index exceeding the pre-determined thresholds and triggering one method out of a plurality of self-learning methods based on the model type;

executing, via the one or more hardware processors, first type of self-learning method for drifted plant KPI models, wherein the drifted plant KPI model include productivity, fuel rate, yield, agglomerate quality, tumbler index, reduction degradation index, reducibility index, the plant KPI;

performing self-learning of the physics-based and data-driven models of the agglomeration plant by re-training active models, wherein the active models are re-trained using recent and historical data of the agglomeration plant to obtain re-trained models;

executing, via the one or more hardware processors, second type of self-learning method, wherein the active physics-based model of the thermal agglomeration unit is re-tuned in at least one level based on the sensitivity of tuning parameters to the model predictions, followed by the first type of self-learning method using recent and historical data of the agglomeration plant to obtain re-tuned and re-trained models;

executing, via the one or more hardware processors, third type of self-learning method, wherein the active physics-based model of wet agglomeration and data-driven charging models are re-tuned and re-trained followed by the second type of self-learning method using recent and historical data of the agglomeration plant to obtain re-tuned and re-trained models;

assessing, via the one or more hardware processors, the efficacy of executed self-learning methods by computing the model performance index using the predictions from the re-tuned and re-trained models with the corresponding measured variables; and recommending, via the one or more hardware processors, at least one re-tuned and re-trained model for activation in the agglomeration plant wherein the model performance index of the at least one re-tuned and re-trained model is below the pre-determined thresholds.

2. The method according to claim 1, wherein the data sources of the agglomeration plant comprise one or more of an agglomeration plant automation system, a data acquisition system, a data historian, a laboratory information management system, a manufacturing execution system or a manual input.

3. The method according to claim 1, wherein the preprocessing of data comprises identification and removal of outliers, imputation of missing data, and synchronization and integration of a plurality of variables from one or more data sources using the residence time of all the units of the agglomeration plant.

4. The method according to claim 1, wherein the plurality of soft sensors are physics-based and data-driven soft sensors comprising of:
flow rates of input raw materials to the agglomeration plant,
size distribution of input feed mix,
mean diameter of input feed mix,
chemical composition of input feed mix, and
moisture content of input feed mix.

5. The method according to claim 1, wherein the first set of parameters comprises size distribution, mean diameter, chemical composition and water content of a wet agglomerate and the second set of parameters comprises voidage and permeability of the wet agglomerate bed, the velocity of air through the wet agglomerate bed and a size and chemical species segregation profile of wet agglomerate bed.

6. The method according to claim 1, wherein the third set of parameters comprises:
distributions of temperature and a plurality of chemical species at different heights of the bed and lengths of a thermal agglomeration unit, a velocity and flow rate of inlet air and gas at different lengths of the thermal agglomeration unit,
temperature, velocity and flow rate of outlet gas from different lengths of the thermal agglomeration unit,
a velocity and thickness of the flame front at different lengths of the thermal agglomeration unit,
temperature and flow rate of the exhaust gas from different lengths of the thermal agglomeration unit,
length and location of burn through point in the thermal agglomeration unit, and temperature of agglomerate discharged from the thermal agglomeration unit.

7. The method according to claim 1, wherein the final set of parameters comprises:
productivity, yield, efficiency, fuel rate and percentage of undersized agglomerates from the agglomeration plant, and
size distribution, mean diameter, tumbler index, abrasion index, cold compressive strength, reduction degradation index, reducibility index, and softening melting parameters of the agglomerate.

8. The method according to claim 1 further comprising configuring the optimizer:
after a predefined time interval,
when the key performance indicators of the agglomeration plant cross the predefined thresholds, or
by manual intervention.

9. The method according to claim 1, wherein the plurality of key performance parameters of the agglomeration plant comprises:
productivity, yield, efficiency, fuel rate and percentage of undersized agglomerates from the agglomeration plant,
size distribution, mean diameter, tumbler index, abrasion index, cold compressive strength, reduction degradation index, reducibility index, and softening melting parameters of the agglomerate,
granulation index and mean diameter of the wet agglomerate,
location of burn through point and maximum wind-box temperature in the thermal agglomeration unit,
temperature of waste gas entering the gas cleaning system,
pollutants in the waste gas, and
concentration of pollutants in the waste gas.

10. The method according to claim 1, wherein the plurality of manipulated variables of the agglomeration plant comprises flow rates of input feed materials, flow rates of additives, flow rate of water, temperature profile in the ignition furnace, flow rate of wet agglomerate, and pressure drop in various sections of the thermal agglomeration unit.

11. The method according to claim 1, further comprising providing real-time water content of wet agglomerate from a moisture sensor, real-time size distribution of wet agglomerate from a particle analyzer and real-time temperature distribution in the thermal agglomeration unit from wireless temperature sensors to the process of determining second, third and final set of parameters, and self-learning.

12. The method according to claim 1, further comprising performing simulation tasks in an offline mode using the physics-based wet agglomeration model, the physics-based and data-driven charging models, the physics-based thermal agglomeration model and the plurality of data-driven models of the agglomeration plant.

13. The method according to claim 1, wherein the physics-based wet agglomeration model represents the mixing and particle layering process inside the wet agglomeration unit and the physics-based charging model maps the relationship among the mean diameter of wet agglomerate, the bed height, pressure difference across the bed, velocity of air through the bed and voidage of the bed.

14. The method according to claim 1, wherein the physics-based thermal agglomeration model representing the various physical and chemical phenomena and reactions occurring in the thermal agglomeration unit.

15. A system for optimizing the operation of an agglomeration plant, the system comprising:
an input/output interface for receiving a plurality of data as an input from one or more data sources of the agglomeration plant at a predetermined frequency, wherein the plurality of data comprises of a real-time and non-real-time data;
one or more hardware processors;
a memory in communication with the one or more hardware processors, wherein the one or more first hardware processors are configured to execute programmed instructions stored in the one or more first memories, to:
preprocess the plurality of data;
obtain simulated data using the preprocessed data and a plurality of soft sensors, wherein the simulated data is integrated with preprocessed data to obtain integrated data;
determine a first set of parameters using a physics-based wet agglomeration model and the integrated data;
determine a second set of parameters using physics-based and data-driven charging models, the first set of parameters and the integrated data;
determine a third set of parameters using a physics-based thermal agglomeration model, the first set of parameters, the second set of parameters and the integrated data;
determine a final set of parameters using a plurality of data-driven models, the first, the second and the third set of parameters, and the integrated data;
configure an optimizer using the plurality of physics-based and data-driven models of the agglomeration plant to optimize a plurality of key performance parameters of the agglomeration plant;
generate at least one recommendation using the configured optimizer, wherein the recommendations comprise of optimal settings of a plurality of manipulated variables,
wherein the manipulated variables includes height of the wet agglomerate in the thermal agglomeration from lower to upper limits, a strand speed from lower to higher limits, percentage of return fines or percentage of undersize agglomerate from lower to upper limits and a reduction degradation index (RDI) of the agglomerate from lower to upper limits;
provide the generated recommendations to optimize the key performance parameters of the agglomeration plant; and monitor the key performance parameters of the agglomeration plant using self-learning physics-based and data-driven models and re-tune or re-train physics-based and data-driven models of the agglomeration plant, wherein the self-learning physics-based and data-driven models of the agglomeration plant comprising:
computing, via the one or more hardware processors, a model performance index for each of the plurality of physics-based and data-driven models in real-time by comparing the model outputs with the corresponding measured variables, wherein the model performance index includes an error metrics, percentage of points error, a coefficient of determination and a customized performance metrics;
determining, via the one or more hardware processors, the models responsible for model performance index exceeding the pre-determined thresholds and triggering one method out of a plurality of self-learning methods based on the model type;
executing, via the one or more hardware processors, first type of self-learning method for drifted plant KPI models, wherein the drifted plant KPI model include productivity, fuel rate, yield, agglomerate quality, tumbler index, reduction degradation index, reducibility index, the plant KPI;
performing self-learning of the physics-based and data-driven models of the agglomeration plant by re-training active models, wherein the active models are re-trained using recent and historical data of the agglomeration plant to obtain re-trained models;
executing, via the one or more hardware processors, second type of self-learning method, wherein the active physics-based model of the thermal agglomeration unit is re-tuned in at least one level based on the sensitivity of tuning parameters to the model predictions, followed by the first type of self-learning method using recent and historical data of the agglomeration plant to obtain re-tuned and re-trained models;
executing, via the one or more hardware processors, third type of self-learning method, wherein the active physics-based model of wet agglomeration and data-driven charging models are re-tuned and re-trained followed by the second type of self-learning method using recent and historical data of the agglomeration plant to obtain re-tuned and re-trained models;
assessing, via the one or more hardware processors, the efficacy of executed self-learning methods by computing the model performance index using the predictions from the re-tuned and re-trained models with the corresponding measured variables; and
recommending, via the one or more hardware processors, at least one re-tuned and re-trained model for activation in the agglomeration plant wherein the model performance index of the at least one re-tuned and re-trained model is below the pre-determined thresholds.

16. The system according to claim 15 further comprises a moisture sensor to provide real-time water content of the wet agglomerate.

17. The system according to claim 15 further comprises a particle size analyzer to provide real-time size distribution of wet agglomerate.

18. The system according to claim 15 further comprises a wireless bed temperature sensor to provide real-time temperature at different heights of the bed and lengths of the thermal agglomeration unit.

19. One or more non-transitory machine readable information storage mediums comprising one or more instructions which when executed by one or more hardware processors cause:

receiving a plurality of data as an input from one or more data sources of the agglomeration plant at a predetermined frequency, wherein the plurality of data comprises of a real-time and non-real-time data;

preprocessing the plurality of data;

obtaining simulated data using the preprocessed data and a plurality of soft sensors, wherein the simulated data is integrated with preprocessed data to obtain integrated data;

determining a first set of parameters using a physics-based wet agglomeration model and the integrated data;

determining a second set of parameters using physics-based and data-driven charging models, the first set of parameters and the integrated data;

determining a third set of parameters using a physics-based thermal agglomeration model, the first set of parameters, the second set of parameters and the integrated data;

determining a final set of parameters using a plurality of data-driven models, the first, the second and the third set of parameters, and the integrated data;

configuring an optimizer using the plurality of physics-based and data-driven models of the agglomeration plant to optimize a plurality of key performance parameters of the agglomeration plant;

generating at least one recommendation using the configured optimizer, wherein the recommendations comprise of optimal settings of a plurality of manipulated variables, wherein the manipulated variables includes height of the wet agglomerate in the thermal agglomeration from lower to upper limits, a strand speed from lower to higher limits, percentage of return fines or percentage of undersize agglomerate from lower to upper limits and a reduction degradation index (RDI) of the agglomerate from lower to upper limits;

providing the generated recommendations to optimize the key performance parameters of the agglomeration plant; and monitoring the key performance parameters of the agglomeration plant using self-learning physics-based and data-driven models and re-tune or re-train physics-based and data-driven models of the agglomeration plant, wherein the self-learning physics-based and data-driven models of the agglomeration plant comprising:

computing, via the one or more hardware processors, a model performance index for each of the plurality of physics-based and data-driven models in real-time by comparing the model outputs with the corresponding measured variables, wherein the model performance index includes an error metrics, percentage of points error, a coefficient of determination and a customized performance metrics;

determining, via the one or more hardware processors, the models responsible for model performance index exceeding the pre-determined thresholds and triggering one method out of a plurality of self-learning methods based on the model type;

executing, via the one or more hardware processors, first type of self-learning method for drifted plant KPI models, wherein the drifted plant KPI model include productivity, fuel rate, yield, agglomerate quality, tumbler index, reduction degradation index, reducibility index, the plant KPI;

performing self-learning of the physics-based and data-driven models of the agglomeration plant by re-training active models, wherein the active models are re-trained using recent and historical data of the agglomeration plant to obtain re-trained models;

executing, via the one or more hardware processors, second type of self-learning method, wherein the active physics-based model of the thermal agglomeration unit is re-tuned in at least one level based on the sensitivity of tuning parameters to the model predictions, followed by the first type of self-learning method using recent and historical data of the agglomeration plant to obtain re-tuned and re-trained models;

executing, via the one or more hardware processors, third type of self-learning method, wherein the active physics-based model of wet agglomeration and data-driven charging models are re-tuned and re-trained followed by the second type of self-learning method using recent and historical data of the agglomeration plant to obtain re-tuned and re-trained models;

assessing, via the one or more hardware processors, the efficacy of executed self-learning methods by computing the model performance index using the predictions from the re-tuned and re-trained models with the corresponding measured variables; and recommending, via the one or more hardware processors, at least one re-tuned and re-trained model for activation in the agglomeration plant wherein the model performance index of the at least one re-tuned and re-trained model is below the pre-determined thresholds.

* * * * *